United States Patent [19]
Schmidt et al.

[11] Patent Number: 5,680,476
[45] Date of Patent: Oct. 21, 1997

[54] METHOD OF CLASSIFYING SIGNALS, ESPECIALLY IMAGE SIGNALS

[75] Inventors: Hauke Schmidt, Ulm; Roland Klinnert, Neu-Ulm; Rudi Kober, Oberdischingen, all of Germany; Peter Bock, Washington, D.C.

[73] Assignee: Robert Bosch GmbH, Stuttgart, Germany

[21] Appl. No.: 252,543

[22] Filed: Jun. 1, 1994

Related U.S. Application Data

[63] Continuation of Ser. No. 907,304, Jul. 1, 1992, abandoned.

[30] Foreign Application Priority Data

Jul. 3, 1991 [DE] Germany .................. 41 21 870.1
Oct. 10, 1991 [DE] Germany .................. 41 33 590.2

[51] Int. Cl.⁶ ........................................... G06K 9/62
[52] U.S. Cl. .................. 382/159; 382/170; 382/228; 381/41
[58] Field of Search ............................... 382/14, 15, 18, 382/27, 36, 159, 160, 165, 170, 205, 224, 228; 381/41, 43

[56] References Cited

U.S. PATENT DOCUMENTS

| | | | |
|---|---|---|---|
| 4,066,999 | 1/1978 | Spanjersberg | 382/14 |
| 4,327,354 | 4/1982 | Persoon | 382/27 |
| 4,589,140 | 5/1986 | Bishop et al. | 382/14 |
| 4,760,604 | 7/1988 | Cooper et al. | 382/15 |
| 4,897,881 | 1/1990 | Ledinh et al. | 382/27 |
| 5,065,431 | 11/1991 | Rollett | 381/43 |
| 5,073,962 | 12/1991 | Califano | 382/27 |

FOREIGN PATENT DOCUMENTS 0 191 407  8/1986  European Pat. Off. .

OTHER PUBLICATIONS

Peter Bock et al., "Project Alias Phase I Final Report," Research Institute for Applied Knowledge Processing (FAW), Ulm, Germany, in cooperation with the University of Ulm and Robert Bosch GmbH, Mar. 1990, 68 pages.

*Primary Examiner*—Wellington Chin
*Assistant Examiner*—Timothy J. May
*Attorney, Agent, or Firm*—Frishauf, Holtz, Goodman, Langer & Chick, P.C.

[57] ABSTRACT

Artificial Intelligence (AI) techniques are used for processing data having multiple possible values, for example, gray-scale values of pixels of an image. This is useful in scanning of digitally-coded image data to detect anomalies, for example defects in some of a series of manufactured products. The preferred processing apparatus has either one processing channel or multiple parallel processing channels. The apparatus samples or scans incoming signals to produce a matrix of scan values, selects subsets of the scan values to define samples, extracts at least one feature, such as mean image brightness (MM), activity (MA), gradient absolute value (MG) and/or gradient direction (MD) from each sample, uses the at least one feature as an address to retrieve, from a table, a corresponding probability-of-occurrence value, derives, from the probability-of-occurrence values of a plurality of the samples, a decision value, and compares the decision value with a predetermined threshold value. The probability-of-occurrence values are stored in the table during a "learning" procedure.

22 Claims, 11 Drawing Sheets

Fig. 2a

Fig. 2b $$MM = \left(\sum_{k=1}^{n}\sum_{l=1}^{n} p_{k,l}\right)/n^2$$

$$MA = \sum_{l=1}^{n}\sum_{k=1}^{n-1} |p_{k,l} - p_{k+1,l}| + \sum_{k=1}^{n}\sum_{l=1}^{n-1} |p_{k,l} - p_{k,l+1}|$$

$$MG = \sqrt{\left(\sum_{k=((n+2)\,DIV\,2)}^{n}\sum_{l=1}^{n} p_{k,l} - \sum_{k=1}^{((n+1)\,DIV\,2)}\sum_{l=1}^{n} p_{k,l}\right)^2 + \left(\sum_{k=1}^{n}\sum_{l=((n+2)\,DIV\,2)}^{n} p_{k,l} - \sum_{k=1}^{n}\sum_{l=1}^{((n+1)\,DIV\,2)} p_{k,l}\right)^2}$$

$$MD = \arctan\left(\frac{\sum_{k=1}^{n}\sum_{l=((n+2)\,DIV\,2)}^{((n+1)\,DIV\,2)} p_{k,l} - \sum_{k=1}^{n}\sum_{l=1}^{n} p_{k,l}}{\sum_{k=((n+2)\,DIV\,2)}^{n}\sum_{l=1}^{((n+1)\,DIV\,2)} p_{k,l} - \sum_{k=1}^{n}\sum_{l=1}^{n} p_{k,l}}\right) + \begin{cases} 0° & \geq 0 \\ 180° & < 0 \end{cases}$$

METHOD OF CLASSIFYING SIGNALS, ESPECIALLY IMAGE SIGNALS

This application is a continuation of application Ser. No. 07/907,304, filed Jul. 1, 1992 now abandoned.

CROSS-REFERENCE TO RELATED PATENT APPLICATION AND LITERATURE

COOPER et al./NESTOR European application 0 191 407 A2, publ. 20 AUG. 1986;

PROJECT ALIAS, Phase 1 Final Report, Jan. 1989–March 1990, Research Inst. for Applied Knowledge Processing, Ulm, Germany; (in German: Forschungsinstitut für anwendungsorientierte Wissenverarbeitung or F.A.W.).

FIELD OF THE INVENTION

The present invention relates generally to processing of digital or digitized signals and, more particularly, to processing of gray-scale image data to detect anomalies in the images.

BACKGROUND

In many fields of science and technology, it is necessary to classify real-value signals into one or more classes. The signals may be one-dimensional, such as acoustic signals and other time-dependent measured quantities of various kinds. Two-dimensional signals are functions of two variables, such as camera images, image sequences, projections, and acoustic signals in the form of sonograms. Finally, it is possible to classify n-dimensional signals, which are functions of n variables.

The previous suggestions for classification of signals have often been directed to binary signals, that is, signals which can assume only two states or levels, such as black-white images. Such a system is disclosed in the research report "PROJECT ALIAS—Phase 1 Final Report, Jan. 1989–March 1990," of Research Inst. for Applied Knowledge Processing, Ulm, Germany, published May 16, 1990; the system uses multiple parallel channels to extract features from a stream of binary signals.

Thus, in classifying images with multiple gray levels, one often carries out, prior to the actual classification, a comparison with a threshold value, in order to obtain binary images adapted for processing by a binary classification system. However, this often results in loss of important information.

COOPER et al./NESTOR, INC. European Patent Application 0,191,407 A2, published 20 AUG. 1986 and corresponding to U.S. Ser. Nos. 702,188 and 775,144, filed 1985, discloses another prior art system with multiple classification channels, whose output signals are combined to reach a classification result. In the individual channels, the signals to be classified are compared with prototypes, which represent their class as a hypersphere about their position in pattern space. The radius of this hypersphere is adjusted using a learning algorithm. According to a training phase, pattern vectors are associated with test signals of a particular class, to which the prototype also belongs, and in whose hypersphere they fall. The classification is specified using a spacing measurement, namely the spacing from the input pattern vector to the prototype vector. Extensive overlapping of various classes in pattern space leads in a so-called "confusion zone" to a multiplicity of prototypes with very small "regions of influence"; these can lead to substantial problems in the capacity to generalize the system. Further, many runs in the training phase are needed to define the prototypes.

THE INVENTION

An object of the present invention is to provide an "Artificial Intelligence" method of classifying signals which respectively represent one of multiple possible amplitude values of the signal, which method can readily be adapted to different tasks or physical applications, and which is distinguished by as simple a "learning" process as possible.

Briefly, the method of the present invention carries out, in either one channel or in several parallel channels, the following processing steps:

sampling or scanning incoming signals to produce a matrix of scan values, selecting subsets of said scan values to define samples, extracting at least one feature from each sample, using said at least one feature as an address to retrieve, from a table, a corresponding probability-of-occurrence value, deriving, from the probability-of-occurrence values of a plurality of said samples, a decision value, and comparing said decision value with a predetermined threshold value.

Although the method is adapted to learning and recognition of multiple classes, the learning procedure for a single class is particularly simple, according to the inventive method. The description of the classes is accomplished using only examples of signals which fall within the respective class. The learning process of the present invention extracts, from the data, the rules necessary for classification. The data need only be fed once per example, and the rules are learned implicitly.

Exemplary applications of the inventive method are, among others, the recognition of defective products in a production process (automatic quality control or "reject" removal), the recognition of objects in images of natural scenes, and the recognition of anomalies in time series.

The signals to be classified by means of the present invention can be generated by a single sensor, e.g. a video camera or CCD (Charge Coupled Device) scanner, or by multiple sensors which observe the same process or object. The inventive method is particularly well adapted for solving pattern recognition problems involving multidimensional signals. It is in a position, given good training examples, to independently extract their typical features and to learn them. It is possible to train a system, equipped to practice the inventive method, with either one class or multiple classes, each class and each channel generating a table.

The probability-of-occurrence values, which are stored in the table, need not correspond exactly to the previously conveyed values for the probability of occurrence; the stored values need only to represent a monotonic function of the probability of occurrence.

A refinement of the basic method of the invention is to use multiple processing channels and, prior to further evaluation, to combine with one another the probabilities of occurrence retrieved from the tables of the respective channels. This provides a broader possible field of application for the method of the invention.

One can carry out the method of the invention by spacing the samples from one another by a sampling interval a, where a is an integer whose value is between 1 and the number of temporally sequential sample or scan values which define a sample. For example, given 9 values, a is between 1 and 9. The choice of the size of the samples, and of the interval a permits matching or adjustment of the inventive method to various tasks.

Another refinement of the basic method of the invention is to extract, in each processing channel, multiple features or patterns, which together define an address for retrieval from the table. In this manner, it becomes simple to factor in the combined probability of occurrence of the extracted features. In a practical embodiment of the method of the invention, this refinement must also accommodate itself to the structure of digital signal processing (DSP) systems, which typically operate with an address space of 16 binary places. Since a finer quantization of the features is often neither necessary nor practical, the formation of a common address for multiple features utilizes the aforementioned address space effectively.

A further increase in the flexibility of the method of the invention is made possible if the address also contains supplemental information (Z) which is not derived by extracting features from the samples. This supplemental information can contain, for example, details about the combination and/or weighting of features contained in the same address, about circumstances during generation of the signals, and/or details relating to the internal state of the classification apparatus. Further, the supplemental information can be derived from processing steps subsequent to the feature extraction.

Preferably, one can provide that, in the individual channels, processing occurs with samples of differing sizes and/or involves extraction of different features or patterns. With these differences between the individual channels, the handling of manifold and complex assignments is possible. One may also provide for other differences among the individual channels. To the respective channels, one can direct signals of different sensors which observe the same process or the same object.

Another refinement of the basic method of the invention is, when combining the probability values retrieved from the respective tables, to first combine the probability values retrieved, based upon the features of temporally or spatially corresponding samples, then to calculate from the combined probability values a decision value, and finally to compare the decision value with a predetermined threshold value. This procedure results in a particularly advantageous combination of the results of the individual channels.

In order to suppress noise components of the signals, one can provide filtering of the signals prior to feature extraction and/or filtering of the probability values retrieved from the table or tables.

In a particularly advantageous embodiment of the invention, if each sample is an array of pixels which is m pixels horizontally and n pixels vertically, and the scan or sampling values represent characteristics (such as monochrome gray-scale values or colors), and the samples are taken successively, line-by-line, the offset from one sample to the following one along the horizontal line is a distance of between 1 and m pixels wide, and the offset in the perpendicular direction (e.g. vertically) is a distance between 1 and n pixels high.

With this embodiment, the classification of various image formats is possible. For example, in the field of quality control, the surfaces of a series of industrial products can be monitored for anomalies, e.g. scratches and striations. Preferably, in this embodiment, m=n, which means a quadratic or square sample.

Features which the method is well adapted to extract include: Mean Value, Activity (Sum of the absolute values of the differences between contiguous pixels of the same sample), Moment, Gradient (Magnitude and Direction), Texture, Variance, Fractal Dimensions, Derivatives, Relative or Absolute Position of a Sample, and Temporal or Spatial Combination with at least 1 other sample.

During extraction of features, there occur regularly values with relatively high precision, that is, a large number of binary places. If one uses such values as addresses for the tables of probability of occurrence, during the learning process, one needs, for statistical reasons, a very large number of different samples and different signals, in order that a reliable value for the probability of occurrence can be stored under each individual address of the table. In order to meaningfully reduce the number of various samples and signals, a further refinement of the invention provides that the features used for formation of the respective addresses are scaled and/or quantized, i.e. approximated to a consistent number of binary places.

By "quantization," we mean the subdivision of the respective feature into coarser quantized levels, which in its simplest form can be carried out by leaving off or truncating least significant binary places. By "scaling," we mean primarily use of non-linear characteristic curves, so that, for example, the greater part of a value range is associated with a single address, while the remainder of the value range is quantized over the remaining possible values or addresses.

The method of the invention operates completely translation-invariant. This means that the determination of the probability of occurrence of a pattern does not depend upon the position of the pattern in the signal. This invariance can be partially or completely dispensed with, if the absolute position, or the position relative to a reference point, of the pattern is chosen as a feature.

For this purpose, during the classification of images using the inventive method, one can employ supplemental information, contained in the address, in an advantageous way, namely by having the supplemental information contain data about the position of the respective sample within the image.

An advantageous learning procedure, in the context of the inventive method, is for signals to be fed during a learning procedure, which signals fall into the class or category to be learned, and for the following processing steps to be carried out in a single channel or in parallel in multiple channels:

from multiple scan values, samples are chosen or defined;

from each sample, at least one feature is extracted;

this feature, or the features of respective samples, are used as addresses, so that when a feature occurs, a value previously stored, at the address associated with the feature, is incremented.

Thereby, one can provide that a non-linear weighting of the frequency or "oftenness" distribution is carried out, and/or that, during incrementation, further samples are factored in or taken into consideration.

A further refinement of the invention is to display, on a CRT or LCD or plasma screen or the like, the probability of occurrence data retrieved from the table and/or combined. Such a depiction can be used for verification of the completed classification, which regions have contributed to the decision and how. This is another advantage over other learning procedures, which mostly permit no localized verification of the decision.

DRAWINGS

Identical elements shown in different figures are designated with the same reference numeral in each figure.

DETAILED DESCRIPTION

Figure 1:
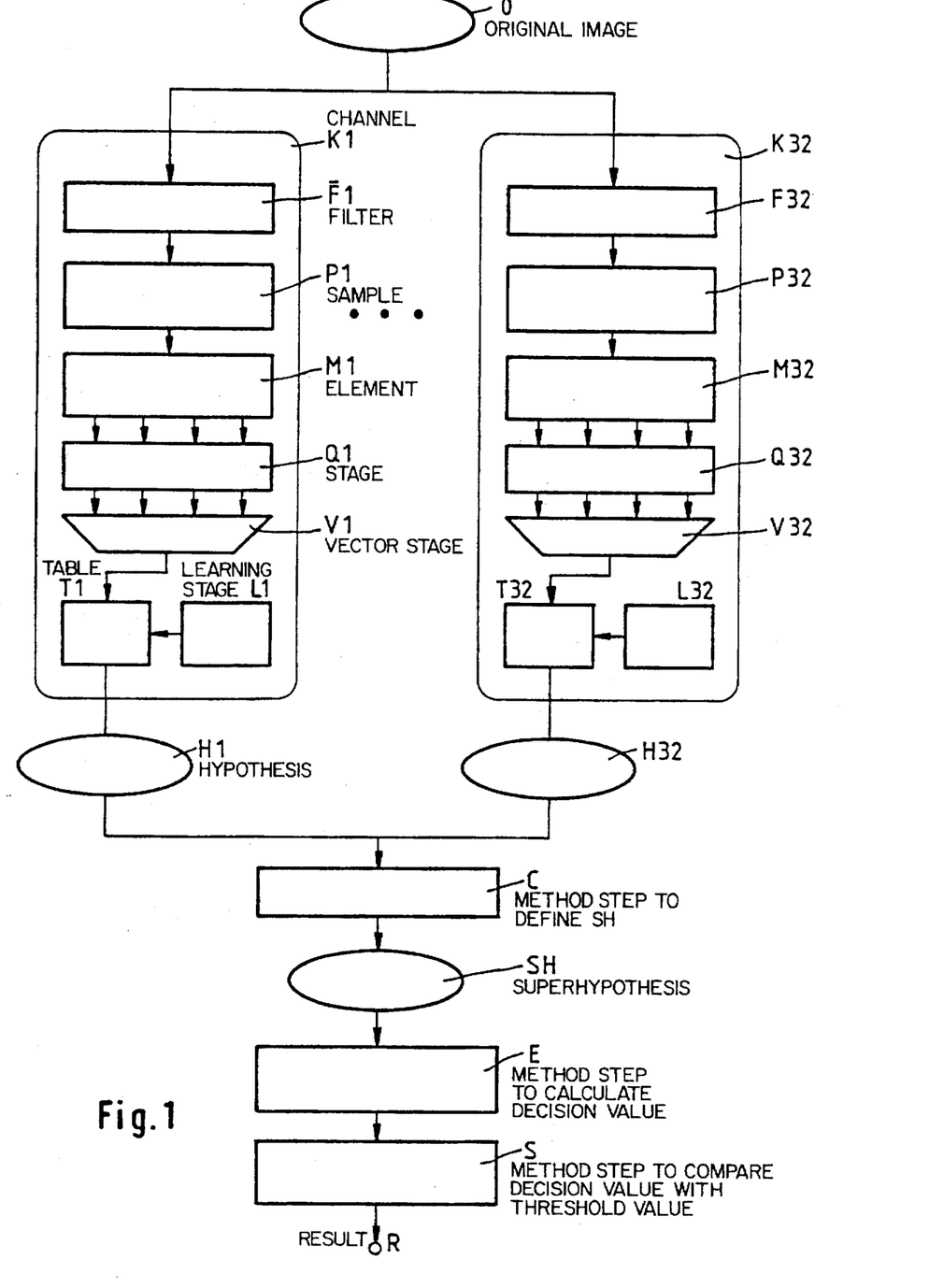
FIG. 1 is a schematic representation of the method of the present invention.
Figure 2A:
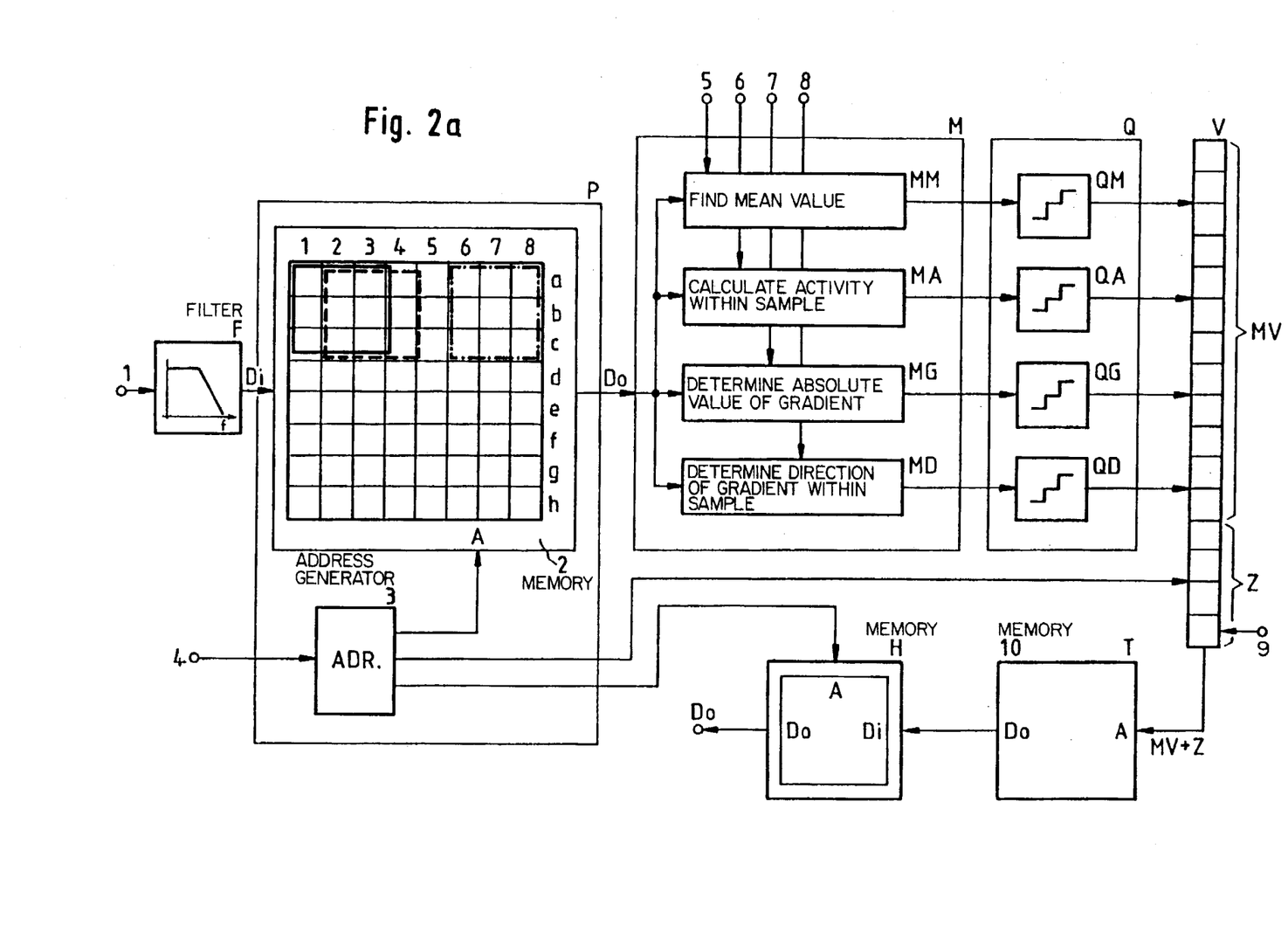
FIG. 2a is a block diagram representing a channel during classification of signals while the equations of FIG. 2b show the calculations which computing units MM, MA, MG and MD of FIG. 2a perform.
Figure 2B:
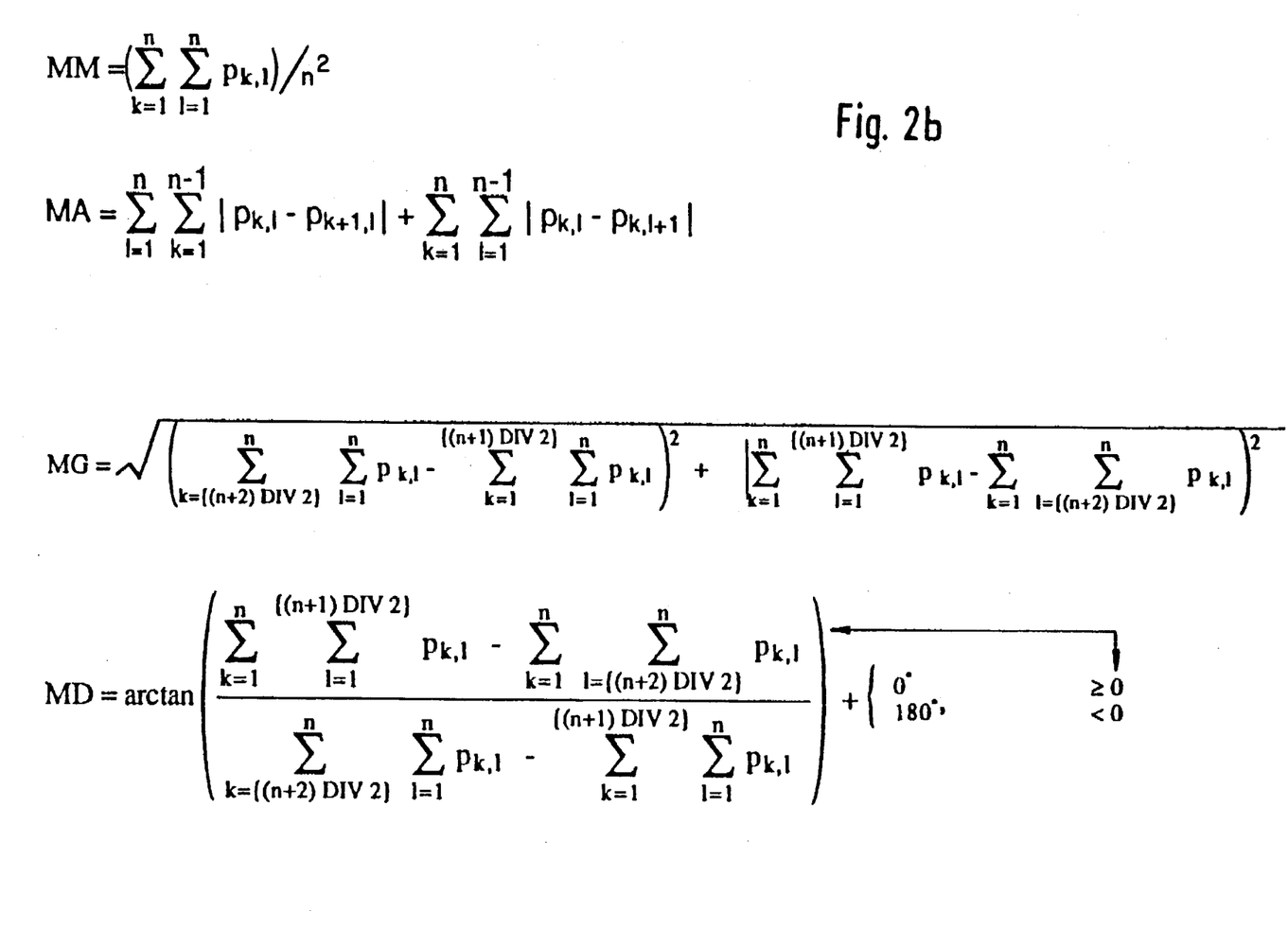
Figure 3:
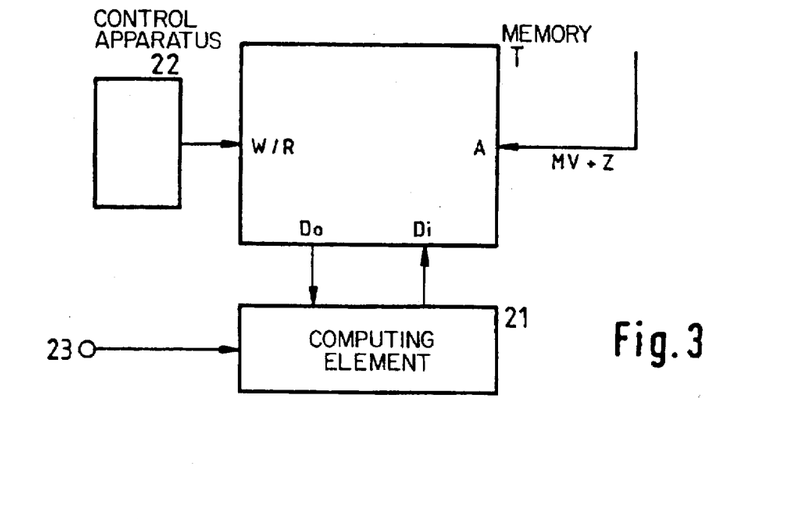
FIG. 3 is a block diagram representing a channel during a "learning" step.
Figure 4:
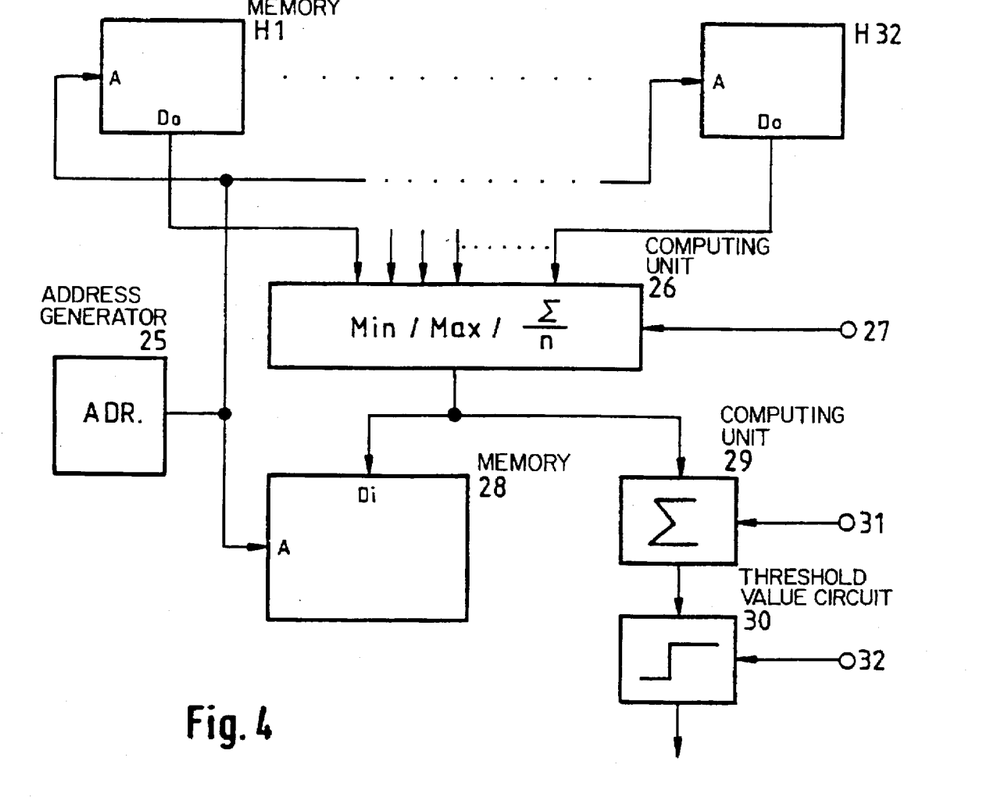
FIG. 4 is a block diagram showing a way of combining the results of various channels.

For carrying out the method of the present invention, suitable computers are those with a corresponding processing capacity. Due to the relatively large number of partially parallel operations, multiple computers, processors, transputers, and the like can be used. The FIG. 1 representation of the inventive method can thus be seen as a suggestion for a suitable program, or as an example of a structure of individual circuit groups. In the sense of a concrete or "hardware" representation, FIGS. 2 through 4 are directed to circuits per se. However, a person skilled in the data processing art could readily use these circuit diagrams to develop suitable "software" programs to perform the functions.

The method depicted in FIG. 1 starts from an original image 0 which, for example, is already in digital form and consists of a 256×256 array of image elements or pixels, each having a gray scale value represented by an 8-bit dataword. For signal processing, 32 channels K1 through K32 are provided. Depending upon the task to be performed, one could also use a smaller or larger number of channels.

At the input of each channel, a respective filter F1 through F32 is provided, with which components, of original image 0, unsuited for classification, are suppressed. Individually, for example, one could suppress predetermined frequencies, especially with a low-pass filter, or one could carry out an undersampling. Frequently, one can also apply a "window" function, according to which only the image elements within a predetermined window, or range of values, get passed along for further processing.

After the filtering, formation of samples P1 through P32 is carried out. Details are set forth below in connection with FIG. 2. From each sample, a respective element M1 through M32 extracts features, for example four features per sample.

In order to avoid an excessive number of addresses, a respective stage Q1 through Q32 quantizes the features, e.g. by truncating several least significant binary places. The individually quantized features are assembled, in a respective vector stage V1 through V32, into a feature vector. Each feature vector is fed to a respective table T1 through T32, in which there is also recorded, for each vector, an associated probability of occurrence, derived from a respective learning stage L1 through L32.

The probabilities of occurrence retrieved for each image are available as a matrix, corresponding to the origins or sources of the individual samples, and form a respective hypothesis H1 through H32. These are combined in a further method step C to define a superhypothesis SH. From this, a further step E calculates a decision value, which subsequently is compared in step S with a threshold value. The result R is available at the output as a determination of the class membership or categorization.

FIG. 2 is a more detailed block diagram of one of the channels K1 through K32 of FIG. 1. An input 1 is connected to a filter F (shown here as a low-pass filter), whose output is connected to a circuit P for breaking down the input images into samples. Circuit P consists essentially of a read-write memory 2 with a data input $D_i$ and a data output $D_o$, as well as an address generator 3 which can be programmed by signals fed into its input 4. Input 4, as well as further inputs 5–9, shown at the top of FIG. 2a, serve for feeding of control signals generated by a control unit, not shown, which direct the individual circuits to perform varying functions, depending upon the respective task and the respective operating state.

Read-write memory 2 has a capacity of 256×256 values. For simplicity of illustration, FIG. 2a shows only memory locations for an 8×8 array of sample values. For recording of the filtered original image, the address generator 3 is so controlled that the address for read-write memory 2 is incremented line-by-line, that is, in the sequence a1, a2, . . . a8, b1, b2, . . . b8.

For formation of samples, address generator 3 is programmed so that the respective scan values of a sample are sequentially read out over data output $D_o$ and fed to the subsequent or downstream circuit M. Given a sample of 9 image elements or pixels, as shown in FIG. 2a, the readout begins with pixel a1, followed by a2 and a3, then pixels b1, b2, and b3, then finally pixels c1, c2, and c3. If the sample with the foregoing image elements is processed in the downstream circuit M, next a one-pixel rightwardly translated sample with the image elements indicated by the dashed border is read out. Further samples shown at top right follow, until the dash-dotted sample is read out. Thereafter follow a further series of samples, starting from image element or pixel b1. The top-left image element of a sample will be called the "origin" of the sample in the following discussion.

As previously mentioned, in the method of the present invention, one can process, in the different channels, samples of differing sizes. One could also provide varying numbers of steps from sample to sample.

In the hardware embodiment of FIG. 2a, circuit M contains four computing units, which are programmable via respective inputs 5 through 8. Computing unit MM has, in the example illustrated, the function of finding the mean or average value of the scan values of a sample, computing unit MA serves for calculation of the activity within the sample, computing unit MG determines the absolute value of the gradient, and computing unit MD determines the direction of the gradient within the sample. The equations, according to which the respective computing units operate, are set forth in FIG. 2b.

The results of the feature extraction are quantized in circuit Q. Depending upon the kind and significance of the individual features, a suitably fine quantization can be carried out. The results are assembled at V into a feature vector MV. In the example, the features Mean Value, Activity, Absolute Value of Gradient, and Angle of Gradient are each quantized to 3 binary places, so that, of a total of 16 binary places, 4 binary places remain for supplemental information Z. In the example shown in FIG. 2, these remaining bits are used to add location information to the feature vector, which is accomplished using the address generator. Further, as shown at the right side of FIG. 2a, the control unit (not shown) can use input 9 to set one binary place of supplemental information Z arbitrarily, as desired.

The feature vector MV and supplemental information Z are fed to a read-write memory 10 as an address. Memory 10 stores, for each address MV+Z, a value which was derived, in a learning process, from the probability of occurrence of the respective feature vector MV. This value can directly represent the probability of occurrence, but alternatively, can also represent a monotonic function of the probability of occurrence.

This value will henceforth be referred to as "Normality" since it represents a standard of the extent to which the respective feature vector MV is "normal" for an image fed during the learning process.

For each sample, in dependence upon the associated address MV+Z, a Normality value is retrieved from read-write memory 10. This value is stored in a further read-write memory H (FIG. 2a), at an address corresponding to the origin of the sample. This address is fed from address generator 3 to the address input A of memory H. By line-by-line retrieval addressing of memory H, one can read out the Normalities line-by-line at data output $D_o$.

Before proceeding to a discussion of the processing of a hypothesis (or hypotheses in the case of multiple channels), an explanation of the "learning" process is in order.

FIG. 3 illustrates selected portions of a channel, which are involved in the learning process or are controlled other than in accordance with the classification. The generation of feature vector MV and of supplemental information Z occurs in the same manner as during the classification itself. Illustration of circuits F, P, M, Q, and V has therefore been omitted. A memory for hypothesis H is not required in connection with the learning process.

In addition to a read-write memory T for the Normalities, the arrangement according to FIG. 3 includes a computing element 21 and a control apparatus 22, which actuates switchover between a Write mode and a Read mode, as indicated at input W/R of memory T. Prior to the beginning of the learning procedure, the content of the read-write memory is erased. As soon as an address MV+Z is present for a sample, the content of the corresponding cell of read-write memory T is read out, and modified in accordance with an instruction previously applied to a control terminal 23 of computing element 21. In the simplest case, this modification consists of incrementation, so that the normality is directly proportional to the frequency of occurrence of the corresponding address.

The computing element can, however, apply other functions, particularly non-linear ones. The result of the calculation is written back into read-write memory T at the same address. Then the address derived from the next sample is fed, and the previously stored Normality is correspondingly modified.

FIG. 4 illustrates an example of the combination of the hypotheses, derived in the individual channels, into a superhypothesis, of the calculation of a decision value, and of the evaluation of the decision value.

The hypotheses of the individual channels are read out of the respective read-write memories HI through H32, in which they were previously stored in accordance with FIG. 2. For generation of the addresses, there is an address generator 25, which feeds the same addresses to the address inputs A of each respective read-write memory H1 through H32. Thus are applied simultaneous, locationally corresponding Normality values to inputs of a computing unit 26, which is programmable, via a control input 27, to carry out various calculations. One can, for example, derive the minimum value or the maximum value or the mean value of the Normality values fed in. The result is written, on the one hand, to a further read-write memory 28 while using the same addresses, and is available there, for example for readout as a screen image representation.

In order to form a decision value, according to the embodiment of FIG. 4, the output values of computing unit 26 are added up in a further computing unit 29. Thus is formed a decision value, which is fed to a threshold value circuit 30. Each of computing unit 29 and threshold circuit 30 is controllable, over a respective control input 31, 32.

The more features, of an image to be classified, fall into the "feature region" created during the learning procedure, the more Normalities of the hypotheses and of superhypotheses assume greater values in the region of their upper limit values. Correspondingly, their sum, i.e. the decision value, becomes larger. In accordance with a threshold determined for each respective application, one can decide whether the image to be classified falls into the learned class or not. Thus, at output R, a corresponding digital signal is made available.

Figure 5A:
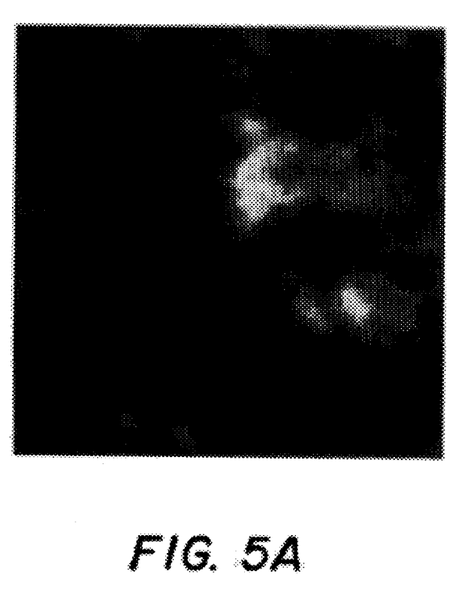
FIGS. 5A to 5R are a series of screen displays illustrating the results of various method steps for a first image to be classified.
Figure 5B:
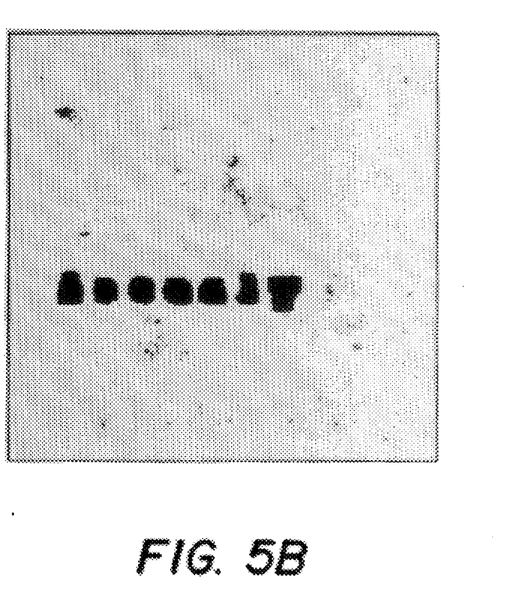
Figure 5C:
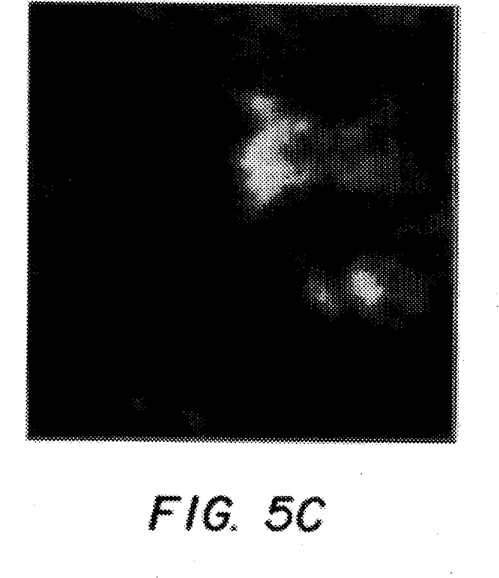
Figure 5D:
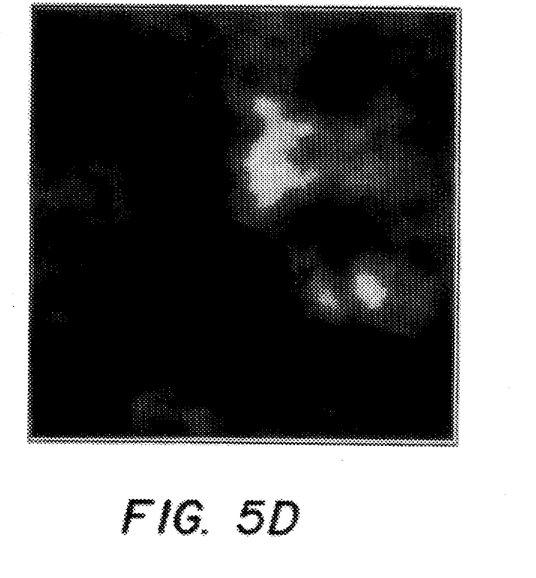
Figure 5E:
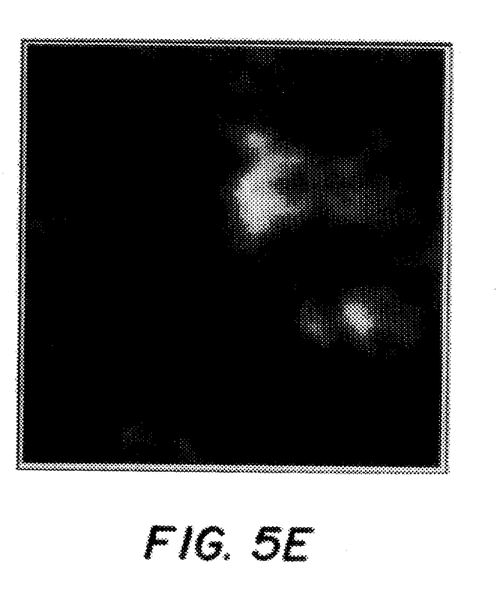
Figure 5F:
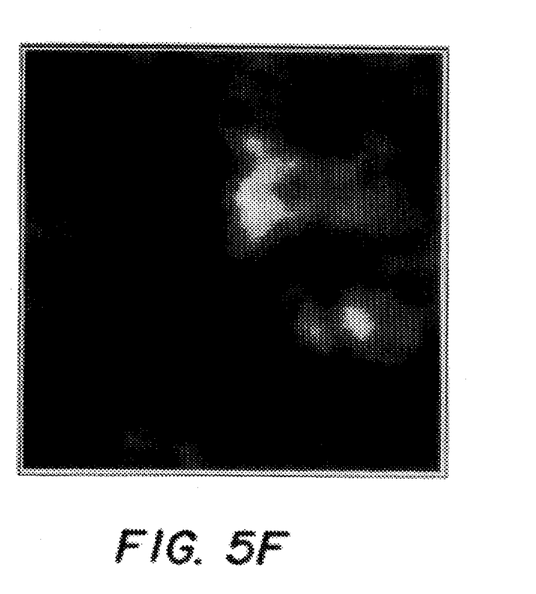
Figure 5G:
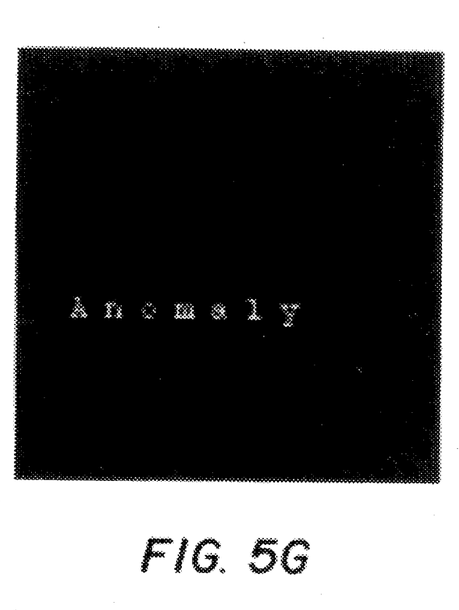
Figure 5H:
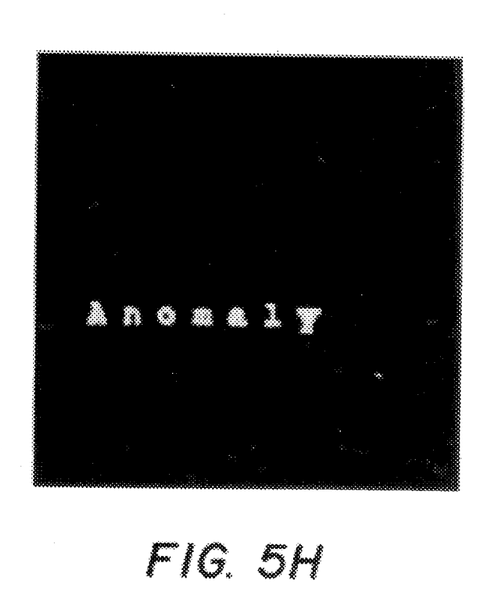
Figure 5I:
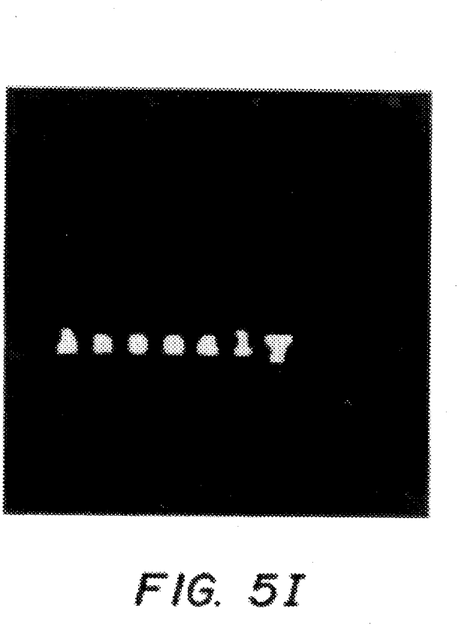
Figure 5J:
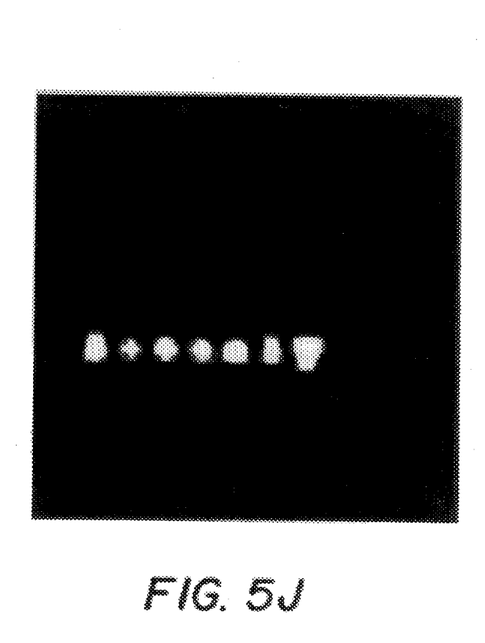
Figure 5K:
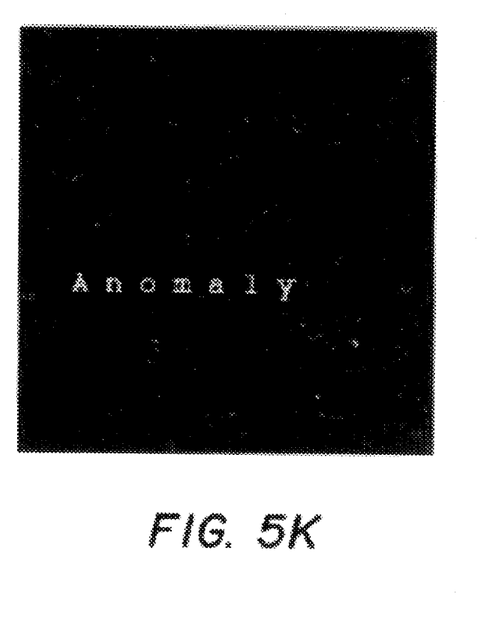
Figure 5L:
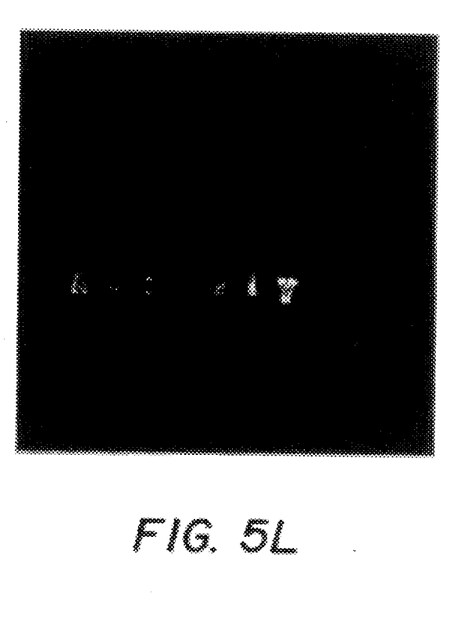
Figure 5M:
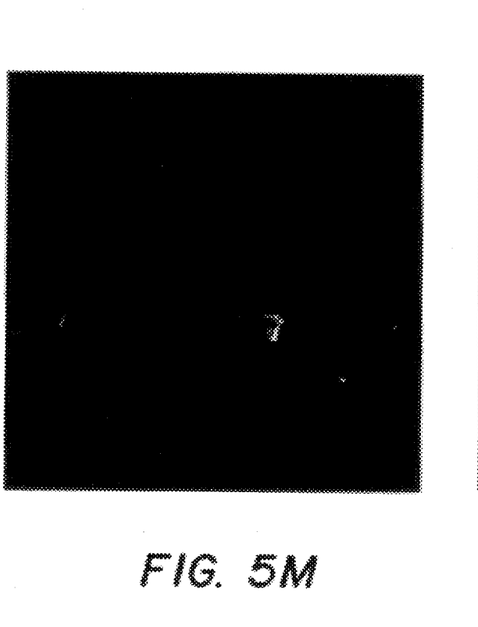
Figure 5N:
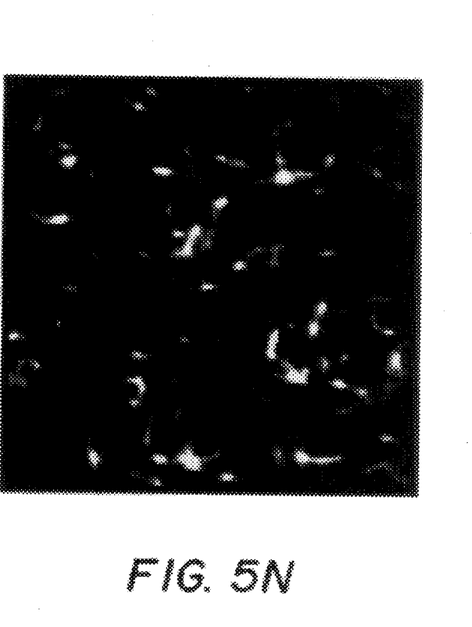
Figure 5O:
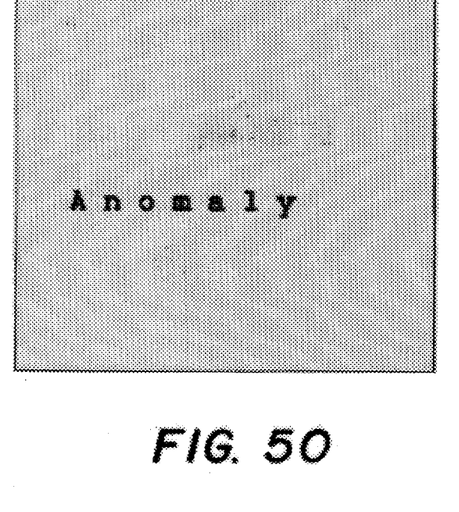
Figure 5P:
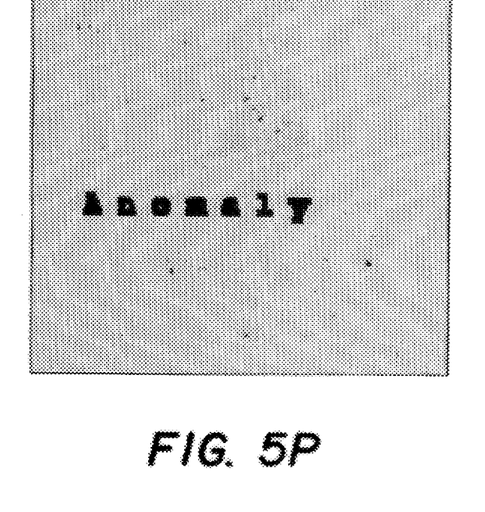
Figure 5Q:
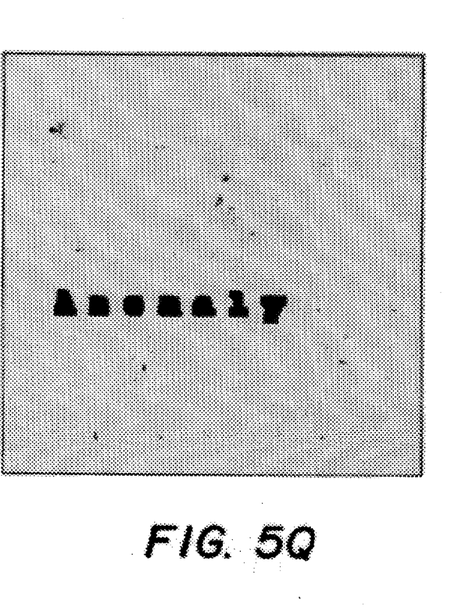
Figure 5R:
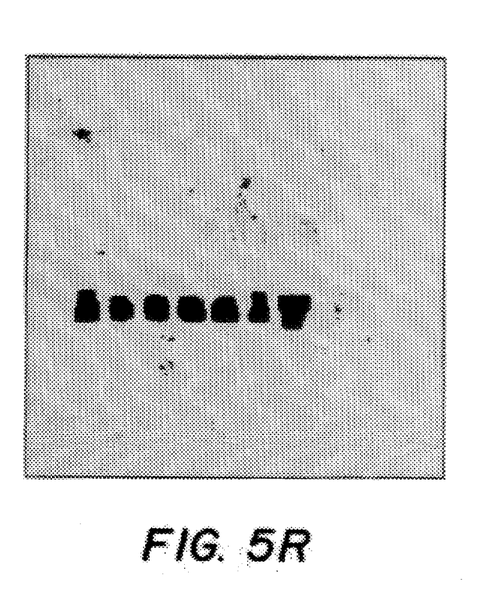

FIGS. 5A to 5R show using multiple screen images, the signals arising during the various processing steps, subject to the following conditions: in a previous learning procedure, fractals were learned, since such images are well suited for experimentation and demonstration purposes. Four channels were used, in each of which the features Mean Value, Activity, and Gradient Absolute Value were extracted. The step width in all channels during formation of samples was 1, while the sizes of the samples vary from channel to channel. The individual images are designated according to the method step (FIGS. 1–2) through which they were created.

The original image according to FIG. 5A represents a fractal which falls into the learned class, but which contains as an anomaly, the word "ANOMALY." FIG. 5B represents the superhypothesis from which, in a simple manner, as described in connection with FIG. 4, the result R can be computed. It is apparent that the surface components, and thus also the number of Normalities with a low value (in the representation as an image, the number of dark pixels or image elements) clearly exceeds the fraction of further Normalities of low value distributed across the image.

These further Normalities of low value scattered across the image arise essentially through an incomplete learning process. During practical application of the method, for economic reasons, the learning procedure is not driven so far, that all conceivable images to be classified with all Normalities reach the maximal value. The threshold at 30 (FIG. 4) is set correspondingly.

Should it be useful, one could, for further evaluation of the superhypotheses, draw upon other known image processing methods which, for example, suppress solitary-occuring Normalities of low value (individual black points in FIG. 5B) and consider only greater aggregations.

As the images in FIG. 5A and FIG. 5B show, the anomalousness within the superhypothesis impacts the observer substantially more strongly than in the original image. Therefore, in this connection, it is pointed out that, depending upon the use or application, the method of the invention is advantageously usable with the formation of one or multiple hypotheses or superhypotheses. On the one hand, for example, in scientific research, the anomalies of an image can be easily observed without carrying out a fully automatic classification. On the other hand, the observation of "intermediate images" during automation applications, e.g. during the learning procedure or in a test phase required by the learning procedure, is provided for, even though one would prefer a fully automatic classification during regular operation.

The images of FIGS. 5C through 5F show the results of Mean Value formation in channels K1 through K4 with samples of different sizes. The larger the samples are, the more details are transmitted. Something similar applies for details of fractals according to Activity, which is illustrated in the images of FIGS. 5K through 5N. As sample sizes increase, the individual values of the activities equalize. For samples, in which pixels of the anomaly participate, there result high Activity values.

Images of FIGS. 5G through 5J are formed from the Absolute Values of the Gradients. In the small samples in channel 1, (image 5G), the written stroke comes across clearly, whereas in larger samples, little differentiation between the written stroke and the fractal is seen.

The individual features represented in the images of FIGS. 5C through 5F, 5K through 5N, and 5G through 5J, form in each channel an address with which one can read out from the table a Normality value, which leads to the hypotheses shown in images of FIGS. 5O through 5R. As a consequence of the previous learning procedure, the images of FIGS. 5O through 5R exhibit, at the places, whose content is determined exclusively by the fractal, essentially white image elements, i.e. maximal Normality. Since the anomaly is not learned, it leads to black pixels, i.e. to very low Normalities.

Figure 6A:
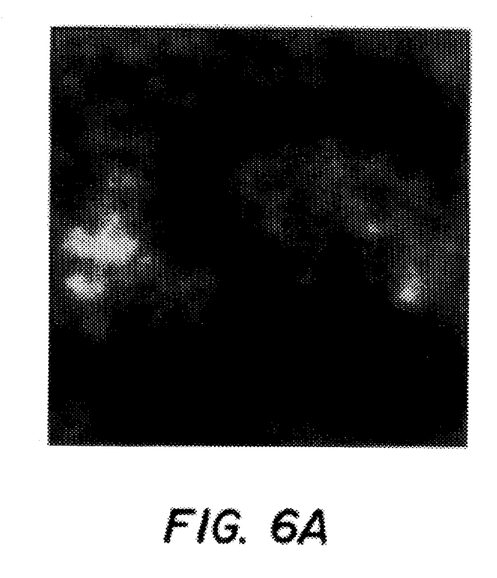
FIGS. 6A and 6B are a series of screen displays during classification of a further image.
Figure 6B:
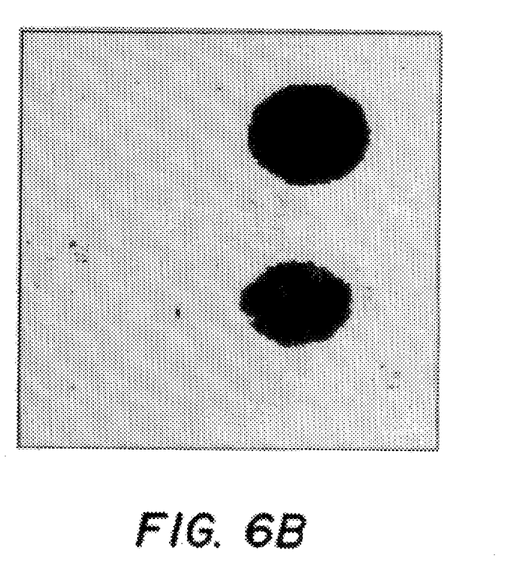

The example illustrated in FIG. 6A and 6B starts from an original image representing a fractal which has noise superimposed on it at two places. From the superhypothesis depicted in FIG. 6B, it is apparent that the associated Normality values are high for the undisturbed image regions and low for the disturbed or noisy image regions. By means of the calculation, represented in connection with FIG. 4, of a decision value and the subsequent comparison with a threshold value, the presence of a disturbance or anomaly can easily be detected here also.

FIGS. 7A to 7G illustrate a successful application of the inventive method to industrial quality control. Images of metallic surfaces are examined and, after a training run of 100 good images, the surface images are classified as either "good" or "bad." For this application, two channels were used. Each original image (FIG. 7A) is fed separately to each of the two channels, and there broken down, without filtering, into overlapping samples, sized 6×6 pixels.

Figure 7A:
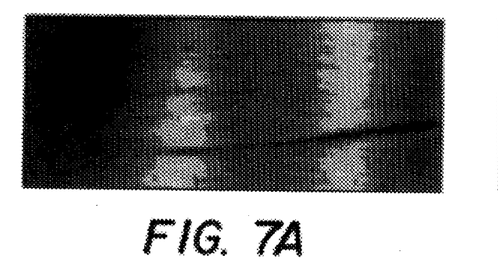
FIGS. 7A to 7G are a series of screen displays during use of the method of the invention for industrial quality control.
Figure 7B:
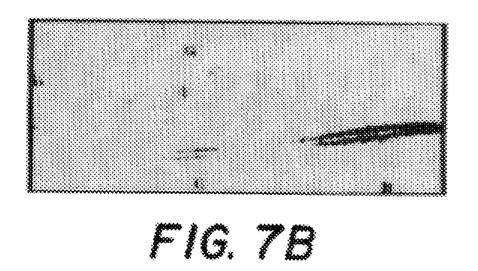
Figure 7C:
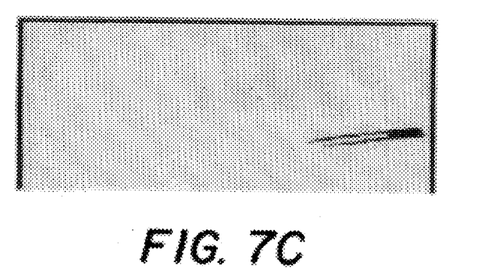
Figure 7D:
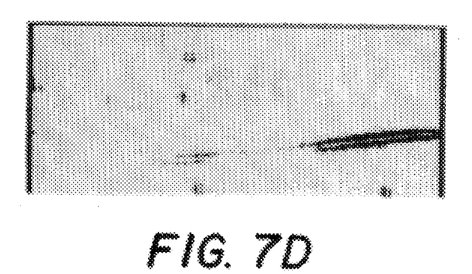
Figure 7E:
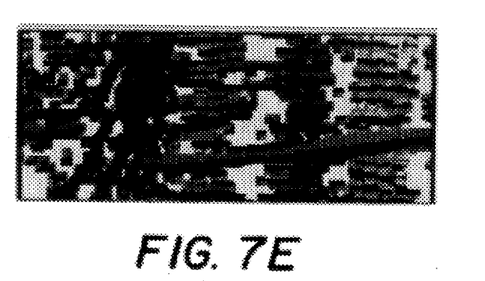
Figure 7F:
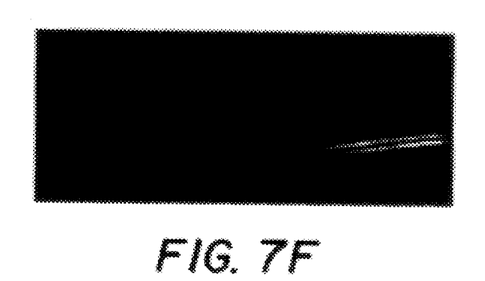
Figure 7G:
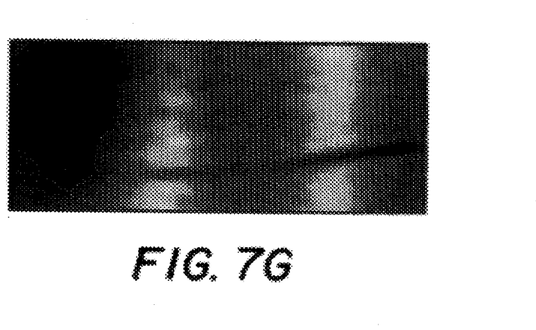

Channel 1 extracts, from these samples, the two features "Middle or Mean Value" (FIG. 7G) and "Gradient Magnitude" (FIG. 7F). The value of each of these features falls in a range between 0% and a maximum value (100%). During feature quantization, the Gradient Magnitude is linearly quantized in a range between 0% and 6% of the maximum value using 8 bits (that is, $2^8=256$ steps or levels). The Mean Value is linearly quantized, using 8 bits, in a range between 0% and 45%. Feature values, which are larger than the upper boundary or limit, are assigned the top quantizing level. By concatenating (stringing together) the quantized feature values, a "feature vector" of 16-bit-length is generated, which addresses the Normality table of the channel.

Channel 2 extracts from the samples, the two features "Gradient Magnitude" (FIG. 7F) and "Direction of Gradient" (FIG. 7E). The direction is linearly quantized using 8 bits in the whole value range from 0% to 360%, while the Magnitude is, as in Channel 1, linearly quantized using 8 bits only in the range from 0% to 6%. The resulting feature vector is again used for addressing of the Normality table of the channel.

The range hypotheses produced in this manner (FIG. 7C and 7D) result through the medium of the superhypotheses (FIG. 7B), from whose mean Normality value the decision value is calculated. If the decision value lies above a previously determined or specified threshold, the input image is classified as "good"; otherwise, it is classified as "bad."

Various changes and modifications, and additional physical applications, are possible within the scope of the inventive concept.

A suitable memory 2 is model no. IDT7006 made by the firm Integrated Device Technology. For 64K-Byte memory 4 chips are needed.

A suitable address generator 3 is model no. IMS T800 made by the firm INMOS. The IMS T800 is a 32-Bit microprocessor, which is part of the transputer family made by INMOS (now part of SGS-Thomson).

The address generation for memory 2 can ,for example, be done with an OCCAM- program such as the following (—OCCAM is a specific programming language for transputers—):

```
Di=data input for memory 2
Da=data -output for memory 2
A=address input for memory 2
sampleLengthY=length of sample in Y-direction (from input 4)
sampleLengthX=length of sample in X-direction (from input 4)
read image data 256×256
SEQ i=0 FOR 256
    SEQ j=0 FOR 256
        SEQ
            A:=(256*i)+j
            valueIn:=Di
            data(A):=valueIn
write sample data 256×256
    SEQ k=0 FOR (257-sampleLengthY)—row-counter
        SEQ I=0 FOR (257-sampleLengthX)—column-counter
            SEQ m=0 FOR sampleLengthY
                SEQ n=0 FOR sampleLengthX
                    SEQ
                        A:=(((256*k)+I)+(256*m))+n
                        valueOut:=data(A)
                        Do:=valueOut
```

Generating the 3-Bit location information for the feature vector V can ,for example, be done with an OCCAM-program such as the following:

Zloc is the additional location information in Y-direction for the feature vector V k is the row-counter in the write sample data 256×256'-routine above and is the location information in Y-direction Zloc:=k/32

The address generation for memory H can ,br example, be done with an OCCAM- program such as the following:

AdrH=address input for memory H k is the row-counter in the write sample data 256×256'-routine above I is the column-counter in the write sample data 256×256'-routine above AdrH:=(256*k)+I A suitable memory 10 is model no. IDT7006 made by the firm Integrated Device Technology. For 64K-Byte memory 4 chips are needed.

A suitable memory H is model no. IDT7006 made by the firm Integrated Device Technology. For 64K-Byte memory 4 chips are needed.

We claim:

1. Method for classification of signals, which signals each have more than two possible amplitude values, each sequence of signals collectively defining image background information and a feature, using data processing means having at least one processing channel (K1–K32), comprising the steps of:

carrying out a learning process which generates and stores, at respective memory addresses in a memory of said data processing means, a table consisting of a plurality of probability-of-occurrence values of respective features, each occurrence of a particular feature during said learning process causing incrementing of the stored probability value of the feature;

sampling incoming signals to produce a matrix of scan values;

selecting subsets of scan values to define samples;

extracting at least one feature from each sample;

using said at least one feature as an address to retrieve, from said table, a corresponding one value from among said plurality of probability-of-occurrence values;

deriving from said one probability-of-occurrence value for each one of a plurality of said features respectively corresponding to a plurality of said samples, a decision value;

comparing said decision value with a predetermined threshold value for classifying the signals; and subjecting said signals to a window function prior to said step of extracting features from said samples, said window function including the step of passing only ones of said samples within a predetermined range of values for further processing by said step of extracting.

2. Method according to claim 1, wherein
   a plurality of processing channels are used; and
   said decision-value-deriving step includes electronically combining the probability-of-occurrence values of all of the samples defined in said selecting step.

3. Method according to claim 2,
   further comprising
   obtaining said incoming signals by imaging each of a series of objects; and
   physically separating said objects into at least two groups, based upon whether said decision value for each object exceeds said threshold value.

4. Method according to claim 2, wherein
   respective channels extract respectively different features from said samples.

5. Method according to claim 2, wherein
   respective channels process samples of different respective sizes.

6. Method according to claim 1, wherein
   a plurality of channels are used; and
   a plurality of features are used to generate each address for retrieval from said table;
   said retrieved probability-of-occurrence values, from respective ones of said plurality of channels, are combined to derive said decision value, which is then compared with said predetermined threshold.

7. Method according to claim 1, wherein
   said samples are temporally spaced from each other by about a scan period a, which has an integer value between 1 and the number of values which collectively constitute each sample.

8. Method according to claim 1, wherein
   said extracting step comprises extracting a plurality of features in each channel, and
   said features are used together to define said address in said table.

9. Method according to claim 4, wherein
   said address includes supplemental data (Z) derived independently of features extracted from said samples.

10. Method according to claim 9, wherein
    said supplemental data (Z) includes information concerning relative weighting of features contained in the same address.

11. Method for classification of signals, which signals each have more than two possible amplitude values, each sequence of signals collectively defining image background information and a feature, using data processing means having at least one processing channel (K1–K32), comprising the steps of:

carrying out a learning process which generates and stores, at respective memory addresses in a memory of said data processing means, a table consisting of a plurality of probability-of-occurrence values of respective features, each occurrence of a particular feature during said learning process causing incrementing of the stored probability value of the feature;

sampling incoming signals to produce a matrix of scan values;

selecting subsets of scan values to define samples;

extracting at least one feature from each sample;

using said at least one feature as an address to retrieve, from said table, a corresponding one value from among said plurality of probability-of-occurrence values;

deriving from said one probability-of-occurrence value for each one of a plurality of said features respectively corresponding to a plurality of said samples, a decision value;

comparing said decision value with a predetermined threshold value for classifying the signals; and wherein:
    a set of prototype signals which represent an image feature each have a defined position in a pattern space;
    a hypersphere about each prototype signal's position defines a respective class of similar images; and
    for each class, a number of said probability-of-occurrence value tables is provided, which number corresponds to the number of processing channels used in said data processing means.

12. Method according to claim 11,
    further comprising the step of
    filtering said probability-of-occurrence values retrieved from said table.

13. Method for classification of signals, which signals each have more than two possible amplitude values, each sequence of signals collectively defining image background information and a feature, using data processing means having at least one processing channel (K1–K32), comprising the steps of:

carrying out a learning process which generates and stores, at respective memory addresses in a memory of said data processing means, a table consisting of a plurality of probability-of-occurrence values of respective features, each occurrence of a particular feature during said learning process causing incrementing of the stored probability value of the feature;

sampling incoming signals to produce a matrix of scan values;

selecting subsets of scan values to define samples;

extracting at least one feature from each sample;

using said at least one feature as an address to retrieve, from said table, a corresponding one value from among said plurality of probability-of-occurrence values;

deriving from said one probability-of-occurrence value for each one of a plurality of said features respectively corresponding to a plurality of said samples, a decision value;

comparing said decision value with a predetermined threshold value for classifying the signals;

measuring at least one of color and gray-scale brightness of pixels of an image; and wherein:

each of said samples is an array of m×n pixels arranged in a line-and-column rectangular raster pattern;

an offset along a line between successive samples is an integer number of pixel-widths between 1 and m;

the offset perpendicular to said line between successive samples is an integer number of pixel-widths between 1 and n; and said features used for address generation are processed using a non-linear characteristic curve.

14. Method according to claim 13, wherein m=n.

15. Method according to claim 13, wherein said feature extracting step involves extracting at least one of the following features:

Mean Value of the sample values;

Activity (sum of the absolute values of the differences between contiguous pixels of the same sample);

Moment of the sample values;

Gradient (Magnitude and Direction) of the sample values within a sample;

Texture of the sample values;

Variance of the sample values;

Fractal Dimensions of the sample values;

Derivatives of the sample values;

Relative or Absolute Position of a Sample; and

Temporal or Spatial Combination with at least 1 other sample.

16. Method according to claim 13, wherein said address includes not only said features but also supplemental information (Z).

17. Method according to claim 16, wherein said supplemental information (Z) includes an indication of position of said sample within said image.

18. Method according to claim 13, further comprising displaying on a screen said probability-of-occurrence values retrieved from said table.

19. Method according to claim 13, wherein said features used for address generation are truncated to a predetermined number of significant binary places.

20. Method for classification of signals, which signals each have more than two possible amplitude values, each sequence of signals collectively defining image background information and a feature, using data processing means having at least one processing channel (K1–K32), comprising the steps of:

carrying out a learning process which generates and stores, at respective memory addresses in a memory of said data processing means, a table consisting of a plurality of probability-of-occurrence values of respective features, each occurrence of a particular feature during said learning process causing incrementing of the stored probability value of the feature;

sampling incoming signals to produce a matrix of scan values;

selecting subsets of scan values to define samples;

extracting at least one feature from each sample;

using said at least one feature as an address to retrieve, from said table, a corresponding one value from among said plurality of probability-of-occurrence values;

deriving from said one probability-of-occurrence value for each one of a plurality of said features respectively corresponding to a plurality of said samples, a decision value;

comparing said decision value with a predetermined threshold value for classifying the signals;

modifying said probability-of-occurrence values of respective features stored in said memory in accordance with a frequency of occurrence of each address of said memory to increment a value previously stored at said address, in response to said step of using; and wherein:

said incoming signals have more than one possible amplitude value, and the steps of sampling, selecting, extracting and using are carried out in parallel, in a plurality of channels.

21. Method according to claim 20, further comprising deriving a frequency-of-occurrence distribution; and subjecting said distribution to a non-linear weighting.

22. Method according to claim 20, further comprising using features of other samples as a factor in performing said incrementation.

* * * * *